Figure 1:
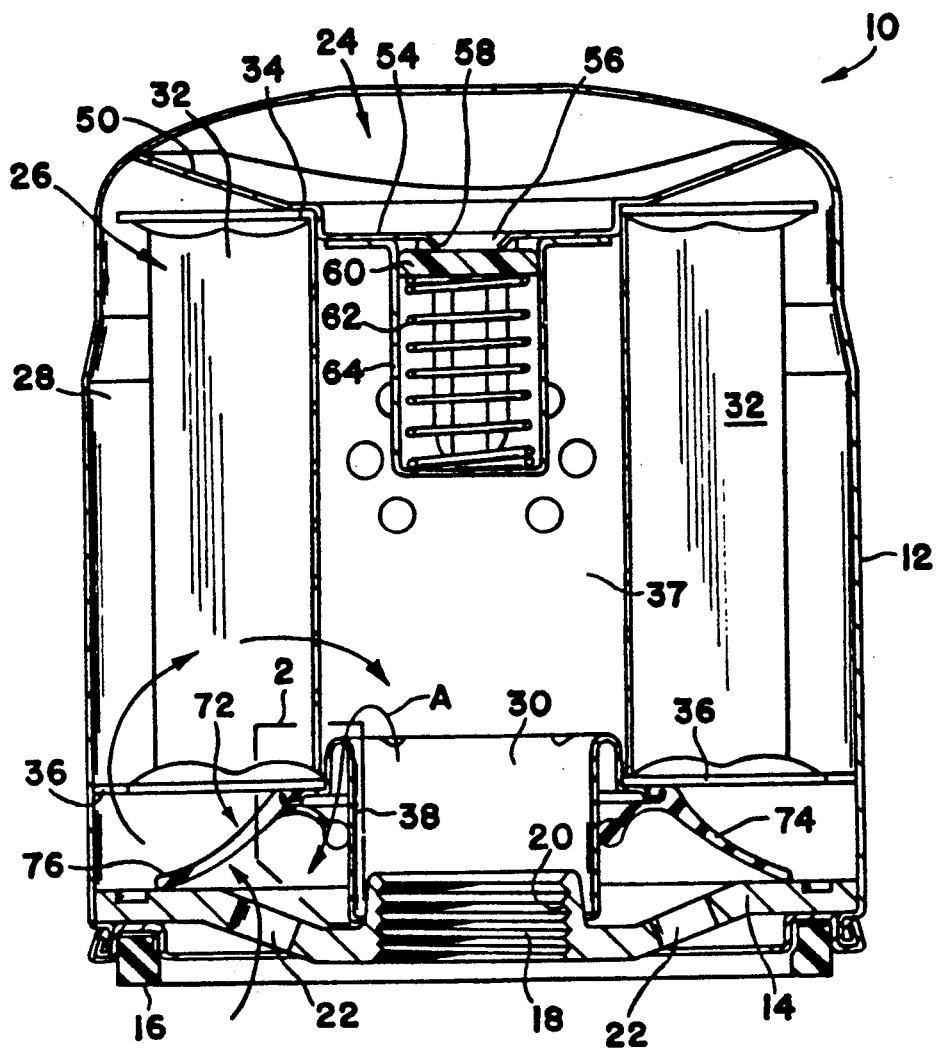

United States Patent [19]

Hutchins et al.

[11] Patent Number: 5,037,539

[45] Date of Patent: Aug. 6, 1991

[54] LIQUID FILTER WITH BYPASS PASSAGE

[75] Inventors: Charles K. Hutchins, Cranston; Glenn C. Anderly, West Warwick; Bruce M. Roxburgh, Barrington; Richard L. McNeil, Lincoln; James A. Gasparri, North Providence, all of R.I.

[73] Assignee: Allied-Signal Inc., Morristown, N.J.

[21] Appl. No.: 349,682

[22] Filed: May 8, 1989

[51] Int. Cl.$^5$ .............................................. B01D 27/10
[52] U.S. Cl. ..................................... 210/133; 210/136; 210/416.5; 210/440; 210/443; 210/456
[58] Field of Search ............... 210/116, 117, 130, 132, 210/133, 136, 168, 416.5, 435, 436, 440, 443, 450, 456, 497.01

[56] References Cited

U.S. PATENT DOCUMENTS

| | | | |
|---|---|---|---|
| 3,231,089 | 1/1966 | Thornton | 210/130 |
| 3,332,554 | 7/1967 | Humbert, Jr. | 210/130 |
| 3,467,256 | 9/1969 | Humbert, Jr. et al. | 210/132 |
| 3,557,957 | 1/1971 | Baldwin | 210/130 |
| 3,695,437 | 10/1972 | Shaltis | 210/136 |
| 3,726,403 | 4/1973 | Shaltis | 210/132 |
| 3,774,764 | 11/1973 | Baldwin | 210/130 |
| 3,957,640 | 5/1976 | Stack | 210/130 |
| 3,984,318 | 10/1976 | Bumb | 210/130 |
| 4,144,168 | 3/1979 | Thornton | 210/130 |
| 4,755,289 | 7/1988 | Villani | 210/132 |

FOREIGN PATENT DOCUMENTS 1045288 10/1966 United Kingdom .

Primary Examiner—Robert A. Dawson
Assistant Examiner—Wanda L. Millard
Attorney, Agent, or Firm—Ken C. Decker; William N. Antonis

[57] ABSTRACT

A liquid filter for filtering the lubricating oil of an internal combustion engine includes a bypass passage permitting liquid to flow from the outlet to the inlet in a direction opposite to normal flow through the filter when the engine is initially filled with oil by a pressure lubrication fill process. When the engine is first started, a valve responds to normal engine oil pressure to close the bypass passage.

12 Claims, 1 Drawing Sheet

LIQUID FILTER WITH BYPASS PASSAGE

This invention relates to a filter for filtering the lubricating oil of an internal combustion engine.

When a new engine is first started, the internal parts are not lubricated, since the oil pump has not had a chance to pump up oil from the crankcase. To minimize wear when first starting a new engine, some engine manufacturers pressure lubricate internal engine parts when the new engine is first filled with oil. When the engine is filled with oil which is used to pressure lubricate the internal engine parts, oil flows through the oil filter in a direction reverse to the normal direction of oil flow through the filter. In other words, instead of flowing from the inlet to the outlet of the filter as occurs during normal operation of the engine, flow during pressure filling of the engine is from outlet to inlet. Since most oil filters are equipped with an anti-drainback valve to prevent oil from flowing out of the inlet of the filter when the engine is shut off after normal running, this anti-drainback valve prevents the reverse flow through the filter which occurs during the pressure lubricating initial fill of the engine. If the filter is not filled with oil prior to engine start-up, there will be a delay in obtaining proper oil pressure at critical wear points until the engine oil pump does fill the filter with lubricating oil. Accordingly, the primary purpose of pressure lubrication is defeated.

The present invention solves this problem by providing a spin-on oil filter which provides a bypass passage which permits flow of lubricating oil from the outlet to the inlet in reverse of the normal direction of flow during the pressure oil fill operation. A special valve member includes a skirt which provides the normal anti-drainback feature to prevent oil drainback through the inlet during normal operation of the engine, but also includes a pressure responsive surface which stretches to permit the reverse flow of oil through the bypass passage during the pressure oil fill operation. When the vehicle engine is started for the first time, normal pressure communicated through the inlet openings forces the valve member into a position blocking the bypass passage, to hereby prevent the reverse flow of lubricating oil thereafter.

Accordingly, the present invention has the advantage of permitting pressure oil lubrication of all internal engine parts to also fill the oil filter during the normal pressure initial oil fill of the engine. After the engine is first started, normal flow through the filter closes the bypass passage, thereby forcing all of the lubricating oil to flow through the media.

Figure 2:
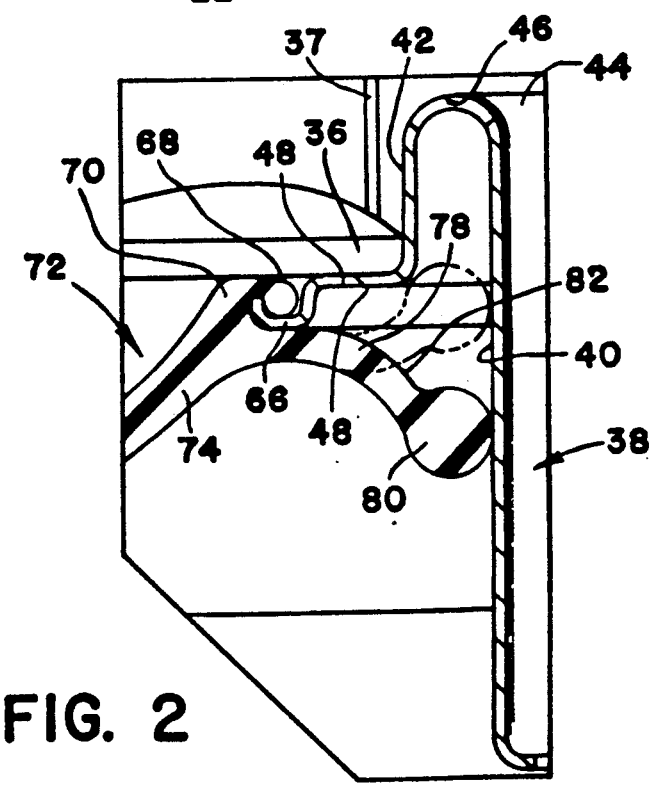

This and other advantages of the present invention will become apparent from the following description, with reference to the accompanying drawings, in which:

FIG. 1 is a longitudinal cross-sectional view of a lubricating oil filter for an internal combustion engine made pursuant to the teachings of the present invention; and FIG. 2 is an enlargement of the circumscribed portion of FIG. 1.

Referring now to the drawings, a lubricating oil filter for an internal combustion engine is generally indicated by the numeral 10. Filter 10 includes a conventional, can-shaped housing 12 having an open end closed by a conventional tapping plate 14 which carries a circumferentially extending, resilient gasket 16 which is adapted to sealingly engage the engine mounting surface. Tapping plate 14 defines an outlet opening 18 which is co-axial with the housing 12 and is threaded as at 20 so that the filter can be threaded on to the conventional mounting stud (not shown), which projects from the filter mounting surface on the engine. An array of circumferentially spaced inlet openings 22 circumscribe the outlet opening 18. During normal running operation of the engine, lubricating oil communicates into the housing 12 through the inlet opening 22 and communicates from the housing 12 back into the engine through the outlet opening 18.

The housing 12 defines a chamber 24 therewithin which receives a media cartridge generally indicated by the numeral 26 which divides the chamber 24 into an inlet section 28 which communicates with the inlet openings and an outlet section 30 which communicates with the outlet opening 18. Cartridge 26 includes a conventional, circumferentially extending array of pleated filter paper 32, which carries upper and lower end caps 34 and 36 which seal the upper and lower edges of the media 32 and a supporting centertube 37. The lower end cap 36 is supported by an annular, centertube cap or supporting member 38 which is mounted on the tapping plate 14 circumscribing the outlet opening 18.

Supporting member 38 includes a pair of concentric, circumferentially extending surfaces 40, 42 which circumscribe the outlet opening 18, and which are connected by a folded over portion 44. A series of circumferentially spaced apertures 46 perforate the folded over portion 44 to permit bypass flow of fluid in the reverse of normal direction, that is, from the outlet 18 to the inlet openings 22, while the above described pressure oil filling operation is taking place. Circumferentially extending surface 42 cooperates with the end cap 36 to center the cartridge 26 within the housing 12. Circumferentially extending surface 42 terminates in a radially projecting, circumferentially extending ledge or stop surface 48, which supports the lower end of centertube 37 and end cap 36. The cartridge 26 is loaded against the ledge 48 by a conventional leaf spring 50 which bears against the upper end cap 34 and the closed end of the housing 12. The leaf spring 50 projects from a disc 54 which at least partially closes the open upper end of the centertube 37. The disc 54 defines a central opening 56 circumscribed by a circumferentially extending valve seat 58. A substantially circular valve member 60 is yieldably urged into sealing engagement with the valve seat 58 by a spring 62, one end of which bears against the valve member 60 and the other end of which bears against the end of a spring caging member 64, which projects into the cavity defined by the centertube 37 from the disc 54.

A circumferentially extending groove 66 is provided in the ledge 48 and clamps a circumferentially extending bead 68 against the lower end cap 36. The bead 68 is carried on a circumferentially extending arm 70 of a valve disc generally indicated by the numeral 72. Valve disc 72 is molded from a resilient, stretchable material, such as rubber. Valve disc 72 includes a circumferentially extending deflectable skirt 74 from which the arm 70 extends. Arm 70 terminates in circumferentially extending tip 76, which bears against the tapping plate 14, thereby serving as an anti-drainback valve to prevent lubricating oil from draining out the inlet section 28, as will hereinafter be described. A second arm 78 branches from the skirt 74 and terminates in a bead 80 which slidably engages circumferentially extending surface 40. The arm 78 defines a fluid pressure responsive surface 82 on the upper edge, viewing the Figures, thereof.

In operation, when the filter 10 is manufactured, the arm 78 of the sealing disc 72 is in the position illustrated in the solid lines in FIG. 2. When the engine lubricating system is first filled with lubricating oil using the pressure oil fill method discussed above, lubricating oil is communicated into the filter 12 through the outlet opening 18. Lubricating oil then flow through the apertures 46, as indicated by arrow A in FIG. 1. The arm 78 is made sufficiently stretchable that pressure of the lubricating oil acting on the fluid pressure responsive surface 82 stretches the arm 78, thereby permitting lubricating oil to force the bead 80 away from the circumferentially extending surface 40 to permit lubricating oil to communicate into the inlet section 28, and then out of the inlet openings 22 to fill the remainder of the lubricating system of the engine. The pressure required to stretch the arm 78 offers sufficient resistance to flow of the lubricating oil that the outlet section 30 fills with oil first. Accordingly, the lubricating system of the engine, including the filter 10, is completely filled with lubricating oil before the engine is started for the first time, thus assuring proper lubrication of the internal engine parts to prevent severe wear from occurring during initial start-up.

When the vehicle engine is started, pressurized lubricating oil is communicated through inlet openings 22. Fluid pressure entering through inlet openings 22 deflects the skirt 74, thereby permitting lubricating oil to communicate through the inlet section 28, and through the media 32, which filters the lubricating oil. The lubricating oil then passes through the apertures in the centertube 37 and out of the outlet opening 18. When the engine is turned off, skirt 74 prevents drainback of engine oil from inlet section 28 through the inlet openings 22, thereby preventing the filter from being drained of fluid. The bypass valve 60 opens, to permit lubricating oil to bypass a clogged filter media 32 when the pressure differential between the inlet and outlet sections is sufficiently great to overcome the force of the spring 62.

When the engine is initially started after being filled by the pressure oil fill method described above, pressure of the lubricating oil communicated through the inlet openings 22 acts against the arm 78, forcing it upwardly viewing the Figures into the position illustrated in the broken lines in FIG. 2, so that the effective area of the fluid pressure responsive surface 82 is substantially reduced. Accordingly, communication through the apertures 46 is only permitted upon the initial oil fill of the engine, and communication through the apertures 46 is prevented automatically after the engine is initially started.

We claim:

1. Liquid filter for filtering the lubricating oil of an internal combustion engine comprising a housing defining a chamber therewithin, filtering media within said housing dividing the chamber into an inlet section and an outlet section, inlet means and outlet means for communicating said lubricating oil into said inlet section and out of said outlet section during normal running of said internal combustion engine, and bypass means permitting reverse flow of lubricating oil from said outlet section to said inlet section bypassing said media during initial filling of the engine with lubricating oil after manufacture of the engine but before the engine is first started, said bypass means including aperture means between said inlet and outlet sections for permitting said lubricating oil to pass from said outlet sections to said inlet section and valve means responsive to liquid pressure in said inlet section generated by communication of lubricating oil into said inlet section during normal running of said engine after the engine is first started after being first filled with lubricating oil for closing said aperture means to thereafter prevent communication of lubricating oil between said chambers through said aperture means, said aperture means extending through a support member within said chamber separating the inlet section from the outlet section, said valve means engaging said support member to control communication through the aperture means.

2. Liquid filter as claimed in claim 1, wherein said support member defines a circumferentially extending surface separating the inlet from the outlet section, said valve means including a resilient, stretchable section slidably engaging said surface.

3. Liquid filter as claimed in claim 2, wherein said stretchable section includes a fluid pressure responsive area terminating in a circumferentially extending edge slidably engaging said surface, said fluid pressure responsive area being responsive to fluid pressure of the lubricating oil communicated through the aperture means to stretch said edge out of sealing engagement with said surface to thereby permit communication of said lubricating oil into said inlet section.

4. Liquid filter as claimed in claim 3, wherein said support member includes a stop surface projecting from said circumferentially extending surface, said fluid pressure responsive area being forced against said stop surface by the pressure of lubricating oil in said inlet section attaining a pressure level higher than the pressure level in said outlet section after the engine is started to thereby inhibit stretching of the stretchable section thereafter.

5. Liquid filter as claimed in claim 4, wherein said filtering media includes an annular array of filtering material defining an inner circumferential surface and a circumferentially extending screen circumscribing said inner circumferential surface, said array and said screen having a pair of opposite ends, said stop surface engaging one end of said screen to support the latter.

6. Liquid filter as claimed in claim 5, wherein said valve means includes a circumferentially extending arm terminating in a bead captured between said support surface and a corresponding end of the array to thereby retain the seal in its operative position.

7. Liquid filter as claimed in claim 6, wherein said corresponding end of the array carries an end cap surface, said support surface engaging the end cap surface for supporting said filtering media within said housing, one of said surfaces defining a depression receiving said bead.

8. Liquid filter as claimed in claim 6, wherein relief valve means permits communication around said array from said inlet section to the outlet section when the pressure level in said inlet section exceeds the pressure level in the outlet section by more than a predetermined amount.

9. Liquid filter as claimed in claim 6, wherein said housing includes an end, said outlet means being an outlet opening at the center of said end and said inlet means being an array of inlet openings circumscribing said outlet opening, said seal including a circumferentially extending skirt projecting radially from said fluid pressure responsive area and terminating in a circumferentially extending end engaging said end of the housing radially outwardly from said array of inlet openings to thereby permit communication through said inlet opening into the inlet section but preventing drainback of lubrication oil out of said inlet section through the inlet openings.

10. Liquid filter as claimed in claim 3, wherein said seal includes a circumferentially extending arm captured by said support member to thereby retain the seal in its operative position.

11. Liquid filter as claimed in claim 10, wherein relief valve means permits communication around said array from said inlet section to the outlet section when the pressure level in said inlet section exceeds the pressure level in the outlet section by more than a predetermined amount.

12. Liquid filter as claimed in claim 3, wherein said housing includes an end, said outlet means being an outlet opening at the center of said end and said inlet means being an array of inlet openings circumscribing said outlet opening, said seal including a circumferentially extending skirt projecting radially from said fluid pressure responsive area and terminating in a circumferentially extending end engaging said end of the housing radially outwardly from said array of inlet openings to thereby permit communication through said inlet opening into the inlet section but preventing drainback of lubricating oil out of said inlet section through the inlet openings.

* * * * *